United States Patent Office 3,448,009
Patented June 3, 1969

3,448,009
STABILIZATION OF ENZYMES
Eugene Roberts, Pasadena, Calif., assignor to City of Hope Medical Center, a corporation of California
No Drawing. Filed Nov. 17, 1966, Ser. No. 595,043
Int. Cl. C07g 7/02
U.S. Cl. 195—63       20 Claims

ABSTRACT OF THE DISCLOSURE

A process for stabilizing gamma-aminobutyric acid transaminase, or succinic semialdehyde dehydrogenase, or mixture thereof by lyophilizing the same in the presence of pyridoxal phosphate and a sulfhydryl-containing compound.

Background of the invention

Inasmuch as there are a considerable number of different enzymes, they have been classified for convenience according to the types of reactions they catalyze. One broad class of enzymes is the transferring enzymes which catalyze reaction in which groups are interchanged between molecules. This class includes the transaminases, which bring about the exchange of amino and keto groups. Another class of enzymes is the oxidative enzymes which are concerned with various oxidative processes, such as the dehydrogenases.

The preparation of a transaminase enzyme and a dehydrogenase enzyme from the bacterium *Pseudomonas fluorescens* has been reported (Scott, E. M., and Jakoby, W. B., J. Biol. Chem., 234, 932–936, 1959; Jakoby, W. B., and Scott E. M., J. Biol. Chem., 234, 937–940, 1959; Jakoby, W. B., and Fredericks, J., J. Biol. Chem., 234, 2145–2150, 1959; Baxter, C. F. and Roberts, E., The Proceedings of the Society for Experimental Biology and Medicine, 101, 811, 1959; Jakoby, W. B., Methods in Enzymology, V, 765–778, 1962; and Roberts, E., Methods in Enzymology, VI, 610–615, 1963). The former enzyme, which is hereinafter referred to as gamma-aminobutyric acid transaminase, catalyzes the conversion of gamma-aminobutyric acid to succinic semialdehyde by a transamination reaction with alpha-ketoglutaric acid. The latter enzyme is useful for bringing about the conversion of succinic semialdehyde to succinic acid in an oxidative step accompanied by the conversion of added triphosphopyridine nucleotide (commonly known in the art as TPN) to its reduced form (commonly known in the art as TPNH). This latter enzyme is therefore hereinafter referred to as succinic semialdehyde dehydrogenase. An enzyme system containing both the gamma-aminobutyric acid transaminase and the succinic semialdehyde dehydrogenase is useful in the qualitative and quantitative determination of gamma-aminobutyric acid since the presence of TPNH may be readily spectrophotometrically detected. The rate of TPN reduction and, hence, the amount of TPNH thus formed, are directly proportional to the amount of gamma-aminobutyric acid present provided an excess of the alpha-ketoglutaric acid is present.

Such an enzyme system for the determination of gamma-aminobutyric acid is useful in many areas, as for example, in clinical research. Appreciable quantities of gamma-aminobutyric acid, formed by the decarboxylation of glutamic acid, have been detected in the brain, spinal cord and retina of vertebrates. Recent work has indicated that gamma-aminobutyric acid has potent neuroinhibitory properties and may be of importance in the regulation of activity in the nervous system. Other uses of the gamma-aminobutyric acid transaminase and succinic semialdehyde dehydrogenase enzymes, alone or in combination with each other or different enzymes, will be evident to those skilled in the art.

In view of the uses of an enzyme preparation containing gamma-aminobutyric acid transaminase and succinic semialdehyde dehydrogenase, such preparations are commercially available. However, prior to the instant invention, such commercially available preparations suffered from the disadvantage that they possessed poor storage stability. The enzymes had to be kept frozen at all times, even during shipment, or they soon lost their activity. This necessitated special shipping containers and handling.

The storage stability of gamma-aminobutyric acid transaminase, or succinic semialdehyde dehydrogenase, or mixtures thereof may be improved in accordance with the process of this invention. The enzymes treated in accordance with the process of this invention are considerably more stable than those heretofore commercially available and may be kept at ambient temperatures for prolonged periods of time without any appreciable loss of activity.

It is, therefore, an object of this invention to prepare an enzyme system of high stability.

Another object of this invention is to prepare an enzyme system which may be kept at ambient temperatures longer than those heretofore available without any appreciable loss of activity.

Still another object of this invention is to prepare a stable enzyme system containing gamma-aminobutyric acid transaminase, or succinic semialdehyde, or mixtures thereof.

A further object of this invention is to provide a stable enzyme preparation which is useful for the determination of gamma-aminobutyric acid.

These and further objects of this invention will become apparent or be described as the description thereof herein proceeds.

Summary of the invention

In accordance with this invention, gamma-aminobutyric acid transaminase, or succinic semialdehyde dehydrogenase or a mixture thereof, which is prepared from a strain of *Pseudomonas fluorescens* such as A.T.C.C. 13430, is stabilized by first forming an aqueous solution containing the enzyme or mixture of enzymes, as the case may be, pyridoxal phosphate and a sulfhydryl-containing compound which is non-volatile under the following lyophilization step. The pyriodoxal phosphate and the sulfhydryl-containing compound, such as 2-mercaptoethylamine hydrochloride, are added in amount sufficient to improve the storage stability of the enzyme or mixture of enzymes, but insufficient to substantially destroy the activity thereof. The specific quantities of the pyridoxal phosphate and sulfhydryl-containing compound which are to be used may readily be empirically determined by running tests of small samples of the enzyme or mixture of enzymes, but it is more convenient to measure the activity of the enzyme or mixture of enzymes since the specific amounts of the additives required are related to activity. The aqueous solution is then lyophilized in the usual manner until a preparation which is substantially free of residual or free water is obtained.

Description of the invention

The gamma-aminobutyric acid transaminase and/or the succinic semialdehyde dehydrogenase may be prepared from a strain of *Pseudomonas fluorescens*, and purified, as for example, in accordance with the hereinbefore referred to published procedures of Scott and Jakoby. The organism used may be *Pseudomonas fluorescens*, A.T.C.C. 13430, or any other strain of *Pseudomonas fluorescens* in which are found gamma-aminobutyric acid transaminase and succinic semialdehyde dehydrogenase, such as characterized as those enzymes found in strain 13430. The organism was maintained on 1.5% agar slants containing inorganic salts supplemented with 0.4% of previously neutralized pyrrolidine. The culture was incubated at about 28° for about 24 hours, and was then used to inoculate an inorganic salt medium containing 1% of yeast extract, 0.8% of neutralized pyrrolidine and 0.001% of Dow-Corning AF antifoam emulsion. Growth was allowed to take place at about 25° for 16 hours, and the cells were then harvested, washed with sodium chloride, and frozen.

The purification procedure of Scott and Jakoby consisted of thawing the cells and washing the thawed cells with 0.1 M potassium phosphate buffer (pH 7.35) containing 0.01% of 2-mercaptoethanol. This same type of buffer solution is used in several of the following steps in this procedure. The washed cells were then centrifuged and the supernatant fluid was discarded. The residue was in two steps dispersed in 0.1 M of potassium phosphate buffer and treated in a sonic oscillator to obtain a residue, which was discarded, and a supernatant fluid, which was the crude extract. A 1% solution of protamine sulfate was added to the extract in an amount such that 12.5 mg. were used per g. of cells. The precipitate which was thus formed was removed and 35 g. of ammonium sulfate were added per 100 ml. of the supernatant fluid to form another precipitate which was discarded. The material salting out upon the further addition of 21 g. of ammonium sulfate was separated and dissolved in 0.1 M potassium phosphate. Sufficient 2-mercaptoethanol was added to this fraction to provide a concentration of 0.1%, and this solution was added to cool acetone to yield a precipitate. The precipitate was recovered and suspended in 0.1 M of the phosphate buffer an the insoluble material was removed and discarded. The supernatant fluid was brought to a 2-mercaptoethanol concentration of 0.05% and dialyzed overnight against 0.05 M of the phosphate buffer. After dialysis, the insoluble material was removed, and the remaining solution contained a mixture of the gamma-aminobutyric acid transaminase and the succinic semialdehyde dehydrogenase in a semi-purified form.

In the event that it is desired to separate the two enzymes from one another, the procedure in the aforementioned publications of Scott and Jakoby may be followed. These publications are hereby incorporated by reference as non-limiting detailed examples of procedures for preparing gamma-aminobutyric acid transaminase and succinic semialdehyde dehydrogenase from a strain of *Pseudomonas fluorescens*, such as A.T.C.C. 13430, and purifying and, if desired, separating the same. Various alternative methods may be used in the preparation and purification of the enzymes. For example, neutralized gamma-aminobutyric acid may be used in place of pyrrolidine as the carbon source in the preparation of the enzymes.

The quantities of the pyridoxal phosphate and sulfhydryl-containing compound which are necessary for the stabilization of the enzymes in accordance with this invention are directly related to the activities of the enzymes. It is, therefore, convenient to first determine the activities of the enzyme or mixture of enzymes to be stabilized, and use this as a guide with respect to the quantities of the additive. This may be spectrophotometrically accomplished, as for example, by following an assay procedure such as described in the publications of Scott and Jakoby or Baxter (Methods in Medical Research, 3, 192–195, 1960). In the case of the stabilization of an enzyme system consisting of gamma-aminobutyric acid transaminase and succinic semialdehyde dehydrogenase, as for example, such an assay procedure consists of first preparing a buffer solution by adjusting a 0.1 M sodium pyrophosphate solution to a pH of 8.4 with phosphoric acid and using the buffer solution to prepare a 2-mercaptoethanol reagent solution (25 $\mu$M/ml. of the buffer), a TPN reagent solution (10 $\mu$M/ml. of the buffer) and an alpha-ketoglutaric acid reagent solution (100 $\mu$M/ml. of the buffer). Equal quantities of the three reagent solutions are mixed with a similarly equal quantity of an aqueous solution of a sample of the enzyme system to be stabilized. The enzyme system is already in an aqueous solution when obtained according to the procedure of Scott and Jakoby. To a standard one cm. rectangular silicon cell, 0.3 ml. of an aqueous solution having a gamma-aminobutyric acid concentration of 100 g./ml., 0.9 ml. of the pyrophosphate buffer (pH 8.4), and 1.2 ml. of the prepared mixture are added. This reaction mixture is rapidly mixed and the absorbance (optical density) is immediately read at 340 m$\mu$. The reaction mixture is kept at room temperature and the absorbance is read at one minute intervals until the time of maximum absorbance is reached. The enzyme activity is then calculated from the time of maximum absorbance, using the factor that 30 g. of gamma-aminobutyric acid (0.3 ml. of 100 g./ml. solution) were utilized and the arbitrary definition that one unit of activity of the enzyme system is that amount which consumes one $\mu$mole of gamma-aminobutyric acid per minute using the assay procedure.

The activity of only one of the enzymes may be similarly determined, as by following the procedure described in the papers of Scott and Jakoby. Scott and Jakoby define one unit of activity of gamma-aminobutyric acid transaminase as that amount which allows the formation of one $\mu$mole of TPN per minute, and one unit of activity of succinic semialdehyde dehydrogenase as that amount which catalyzes the formation of one $\mu$mole of TPNH per minute. The above definition of Scott and Jakoby of the activity of gamma-aminobutyric acid transaminase is, in effect, the same as the definition of the system containing gamma-aminobutyric acid transaminase and succinic semialdehyde dehydrogenase since the amount of TPN found is directly proportional to the amount of gamma-aminobutyric acid consumed.

After the activity of the enzyme system (i.e., gamma-aminobutyric acid transaminase, or succinic semialdehyde dehydrogenase, or a mixture thereof) has been determined, it is stabilized in accordance with this invention by preparing an aqueous solution of the enzyme, pyridoxal phosphate, and a sulfhydryl-containing compound, and then lyophilizing the solution.

The pyridoxal phosphate and the sulfhydryl-containing compound are each used in an amount sufficient to provide a substantially storage-stable lyophilized enzyme but insufficient to poison, i.e., substantially adversely affect the activity of, the enzyme. Generally, the pyridoxal phosphate and the sulfhydryl-containing compound are each used in an amount of about 0.1 to 10 millimoles per unit of enzyme activity (as hereinbefore defined), preferably in an amount of about 0.9 to 5 millimoles per unit of enzyme activity. It is not essential that the pyridoxal phosphate and the sulfhydryl-containing compound be used in equal quantities, but it is most convenient to do so. There is no criticality in the method of preparing the aqueous solution, as for example, the pyridoxal phosphate and the sulfhydryl-containing compound may be added in solid form or in aqueous solutions to an aqueous solution of the enzyme system.

The sulfhydryl-containing compound which is added to the enzyme in combination with the pyridoxal phosphate in accordance with this invention prior to the lyophilization step may be any water-soluble sulfhydryl-containing compound which is non-volatile under lyophilization conditions, and this is intended to include water-soluble compounds which yield in the aqueous solution sulfhydryl-containing compounds which are non-volatile under lyophilization conditions. Examples of compounds which are useful in the process of this invention are mercaptoalkylamine salts, e.g., mercaptoalkylamine salts where the alkyl group is a straight or branched chain group containing from 2 to 4 carbon atoms. The salts may be organic or inorganic, as for example, hydrochloride, hydrobromide, sulfate, nitrate, acetate, and the like. Specific examples of these salts include 2-mercaptoethylamine hydrochloride, 4-mercaptobutylamine hydrobromide, and 2-mercaptopropylamine acetate.

Another class of useful sulfhydryl-containing compounds is aminoalkylisothiuronium salts, e.g., salts where the alkyl group is a straight or branched chain group containing from 2 to 4 carbon atoms. These aminoalkylisothiuronium salts, which will yield the foregoing inorganic mercaptoalkylamine salts in the aqueous enzyme-containing solution, may be defined by the general formula,

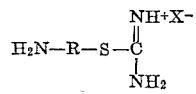

where R is a straight or branched chain alkyl group containing 2 to 4 carbon atoms, and X is an anion such as chloride, bromide, iodide, sulfate, nitrate, and the like. Examples of isothiuronium salts coming within the above formula are 2-aminoethylisothiuronium bromide, 3-aminopropylisothiuronium sulfate and 4-aminobutylisothiuronium chloride. Still other compounds which are useful are cysteine, homocysteine, reduced glutathione, penicillamine, homopenicillamine, thiolhistidine, orthoaminothiophenol, and dithioerythritol.

The lyophilization of the aqueous solution of the enzyme (or mixture of enzymes) is carried out in accordance with standard procedures until a material which is substantially free of residual moisture is obtained, as characterized by a dry powdery appearance. More specifically, the vacuum is preferably maintained during the lyophilization step until a material which contains less than about 5% by weight, more preferably less than about 2% by weight, of free water is obtained.

Upon completion of the lyophilization, the material is preferably sealed in an inert environment, e.g., under vacuum, or in the presence of an inert gas such as nitrogen or argon, to maintain maximum storage stability.

The gamma-aminobutyric acid transaminase, or succinic semialdehyde dehydrogenase, or mixtures thereof which have been treated in accordance with this invention may be kept at ambient temperature, preferably at or below about 25° C., for periods of at least about 60 days without any appreciable reduction in activity. The lyophilized enzymes are prepared for use by merely reconstituting the same, such as in an aqueous medium having a substantially neutral pH.

The following non-limiting examples will illustrate the improved stability of enzymes treated in accordance with this invention.

EXAMPLE I

An aqueous solution containing gamma-aminobutyric acid transaminase and succinic semialdehyde dehydrogenase was prepared from *Pseudomonas fluorescens* following the previously discussed procedure of Scott and Jakoby, and two 3 ml. samples were removed from the enzyme-containing solution. One sample was merely frozen, and the other was treated by adding 1 ml. of an aqueous solution which was $3 \times 10^{-4}$ M in both pyridoxal phosphate and 2-mercaptoethylamine hydrochloride, lyophilizing the aqueous solution until a dry powder was obtained, and sealing the dry powder under vacuum. The amount of each of the additives used was the equivalent of about 2.5 millimoles per unit of enzyme activity. The two preparations were stored overnight. The following day the frozen preparation was thawed and the lyophilized preparation was reconstituted at substantially the same time. The activities of the two preparations were then spectrophotometrically compared using the hereinbefore referred to assay procedure. The lyophilized preparation exhibited an activity of 0.039 units/ml. and the frozen preparation had an activity of 0.032 units/ml. Therefore, the lyophilized preparation was the more active of the two preparations.

EXAMPLE II

In order to demonstrate the importance of the lyophilization being conducted in the presence of the pyridoxal phosphate and a sulfhydryl-containing compound, e.g., 2-mercaptoethylamine hydrochloride, the procedure of Example I was repeated except that the activity of the frozen preparation was compared with that of a lyophilized preparation which was prepared by lyophilization without the prior addition of pyridoxal phosphate and any sulfhydryl-containing compound. In this experiment, the frozen preparation had an activity of 0.039 units/ml. as compared to an activity of 0.0101 units/ml. for the lyophilized preparation.

EXAMPLE III

In still another experiment which was conducted, the relatively long-term storage stability of enzymes treated by the process of this invention was demonstrated. The procedure of Example I was again repeated except that the activity of the frozen preparation stored overnight was compared with the activities of lyophilized preparations stored at 25° C. overnight for two weeks and for thirty days. Upon analysis for activities, the frozen preparation had an activity of 0.025 units/ml., and activities of 0.025, 0.026, and 0.020 units/ml., were noted for the lyophilized preparations stored overnight, for two weeks and for 30 days, respectively. The activity of the preparation stored for thirty days was somewhat lower than the activities of the lyophilized preparations stored overnight and for two weeks, but it was considerably greater than what it would have been if it were not treated in accordance with this invention.

EXAMPLE IV

Another experiment following the general procedure of the foregoing examples was conducted to determine the effect of maintaining the enzymes under different environments. In this experiment, pyridoxal phosphate and 2-mercaptoethylamine hydrochloride were again added to two 3 ml. samples of an aqueous enzyme system containing gamma-aminobutyric acid transaminase and succinic semialdehyde dehydrogenase in amounts equivalent to about 2.5 millimoles per unit of enzyme activity, and the solutions were lyophilized until dry powders were obtained. Upon completion of the lyophilization, one preparation was sealed in a nitrogen atmosphere and the other was sealed in an air atmosphere; and the two preparations were stored at ambient temperatures. A third 3 ml. sample of the aqueous enzyme-containing solution was merely frozen. After 47 days storage, the activities of the three preparations were determined. The frozen preparation had an activity of 0.039, while the lyophilized preparations sealed in nitrogen and air had activities of 0.037 and 0.0083, respectively. Although the lyophilized preparation sealed in air did not lose as much of its activity as it would have if it were not treated according to the process of this invention, its activity was less than that of the lyophilized fraction sealed in nitrogen.

It has thus been clearly demonstrated that improved storage stability, especially at a maximum of 25° C., is imparted to an enzyme system containing gamma-aminobutyric acid transaminase and succinic semialdehyde dehydrogenase prepared from *Pseudomonas fluorescens* by lyophilizing the enzyme system in the presence of pyridoxal phosphate and a sulfhydryl-containing compound. The effectiveness of this treatment is unexpected since the enzyme system prepared and purified according to the published procedure of Scott and Jakoby already contains a mercaptan, i.e., 2-mercaptoethanol, and Scott and Jakoby broadly report (J. Biol. Chem., 234, 935, 1959) that the addition of pyridoxal phosphate to the dialyzed enzyme preparation was without effect. The same treatment may also be used for stabilizing either of the two enzymes alone.

Although the instant invention has been described in relation to specific embodiments, it will be apparent that obvious modifications may be made by one skilled in the art without departing from the intended scope thereof as defined by the appended claims. For example, the process of this invention has been described as being applicable to the stabilization of gamma-aminobutyric acid transaminase, or succinic semialdehyde dehydrogenase, or mixtures thereof. Either one or both of these enzymes may be stabilized according to the process of this invention when one or more other enzymes are also present.

I claim:

1. The process of treating at least one enzyme prepared from *Pseudomonas fluorescens* which comprises lyophilizing an aqueous solution containing at least one enzyme of the group consisting of gamma-aminobutyric acid transaminase and succinic semialdehyde dehydrogenase, pyridoxal phosphate and a sulfhydryl-containing compound to obtain an enzyme preparation substantially free of residual water, said pyridoxal phosphate and sulfhydryl-containing compound being present in said aqueous solution in amounts sufficient to improve the storage stability of said enzyme but insufficient to substantially adversely affect the enzymatic activity, and said sulfhydryl-containing compound being a compound which is non-volatile under the lyophilization and being of the group consisting of mercaptoalkylamine salts, aminoalkylisothiuronium salts, cysteine, homocysteine, reduced glutathione, penicillamine, homopenicillamine, thiolhistidine, ortho-aminothiophenol, and dithioerythritol.

2. The process in accordance with claim 1 in which said pyridoxal phosphate and sulfhydryl-containing compound are each present in said aqueous solution in amounts of about 0.1 to 10 millimoles per unit of enzyme activity.

3. The process in accordance with claim 2 in which said aqueous solution is lyophilized to obtain an enzyme preparation containing less than about 5% free water.

4. The process in accordance with claim 3 in which said sulfhydryl-containing compound is an aminoalkylisothiuronium compound of the formula,

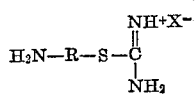

where R is a $C_2$–$C_4$ alkyl radical and X is an anion.

5. The process in accordance with claim 3 in which said sulfhydryl-containing compound is a mercaptoalkylamine salt.

6. The process in accordance with claim 3 in which said lyophilized enzyme preparation is sealed in an inert environment.

7. The process in accordance with claim 6 in which said aqueous solution contains gamma-aminobutyric acid transaminase.

8. The process in accordance with claim 6 in which said aqueous solution contains succinic semialdehyde dehydrogenase.

9. The process in accordance with claim 6 in which said aqueous solution contains a mixture of gamma-aminobutyric acid transaminase and succinic semialdehyde dehydrogenase.

10. The process in accordance with claim 9 in which said sulfhydryl-containing compound is a mercaptoalkylamine salt containing from 2 to 4 carbon atoms in the alkyl radical.

11. The process in accordance with claim 10 in which said pyridoxal phosphate and mercaptoalkylamine salt are each present in said aqueous solution in amounts of about 0.9 to 5 millimoles per unit of enzyme activity.

12. The process in accordance with claim 11 in which said aqueous solution is lyophilized to obtain an enzyme preparation containing less than about 2% free water.

13. The process in accordance with claim 12 in which said mercaptoalkylamine salt is 2-mercaptoethylamine hydrochloride, and said pyridoxal phosphate and 2-mercaptoethylamine hydrochloride are each present in said aqueous solution in amounts of about 2.5 millimoles per unit of enzyme activity.

14. The process in accordance with claim 13 in which said enzyme mixture was prepared from *Pseudomonas fluorescens*, A.T.C.C. 13430.

15. The process in accordance with claim 14 in which said enzyme preparation is sealed under vacuum.

16. The process in accordance with claim 14 in which said enzyme preparation is sealed in the presence of an inert gas.

17. An enzyme preparation which comprises a lyophilized preparation substantially free of residual water containing at least one enzyme of the group consisting of gamma-aminobutyric acid transaminase and succinic semialdehyde dehydrogenase prepared from *Pseudomonas fluorescens*, pyridoxal phosphate and a sulfhydryl-containing compound of the group consisting of mercaptoalkylamine salts, aminoalkylisothiuronium salts, cysteine, homocysteine, reduced glutathione, penicillamine, homopenicillamine, thiolhistidine, ortho-aminothiophenol, and dithioerythritol.

18. An enzyme preparation in accordance with claim 17 in which said pyridoxal phosphate and sulfhydryl-containing compound are each present in amounts of about 0.1 to 10 millimoles per unit of enzyme activity and which contains less than about 5% free water.

19. An enzyme preparation in accordance with claim 18 containing gamma-aminobutyric acid transaminase and succinic semialdehyde dehydrogenase in which said sulfhydryl-containing compound is a mercaptoalkylamine salt containing from 2 to 4 carbon atoms in the alkyl radical.

20. An enzyme preparation in accordance with claim 19 in which said pyridoxal phosphate and sulfhydryl-containing compound are each present in amounts of about 0.9 to 5 millimoles per unit of enzyme activity, said mercaptoalkylamine salt is 2-mercaptoethylamine hydrochloride, and which contains less than about 2% free water.

References Cited

Methods in Enzymology, vol. V, pp. 771–777 (1962).
Methods in Enzymology, vol. VI, pp. 610–615 (1963).

LIONEL M. SHAPIRO, *Primary Examiner.*

U.S. Cl. X.R.

195—68, 103.5

PO-1050
(5/69)

UNITED STATES PATENT OFFICE
CERTIFICATE OF CORRECTION

Patent No. 3,448,009          Dated June 3, 1969

Inventor(s) Eugene Roberts

It is certified that error appears in the above-identified patent and that said Letters Patent are hereby corrected as shown below:

Column 2, line 29, after "semialdehyde" and before the comma (,), -- dehydrogenase -- should be inserted; column 2, line 49, "amount" should read -- amounts --. Column 3, line 67, "3" should read -- 9 --.

SIGNED AND
SEALED
AUG 26 1969

(SEAL)
Attest:

Edward M. Fletcher, Jr.
Attesting Officer

WILLIAM E. SCHUYLER, JR.
Commissioner of Patents